United States Patent [19]
Wheeler et al.

[11] Patent Number: 5,270,645
[45] Date of Patent: Dec. 14, 1993

[54] LINEAR-OUTPUT, TEMPERATURE-STABLE ROTATIONAL SENSOR INCLUDING MAGNETIC FIELD RESPONSIVE DEVICE DISPOSED WITHIN A CAVITY OF A FLUX CONCENTRATOR

[75] Inventors: Mark Wheeler, Cadillac; Anne Gebauer, Reed City; David Bull, Hersey, all of Mich.; Daniel Wilheim, Westchester, Ohio; Stephen Cooper, Tustin; Ronald Ingraham, Reed City, both of Mich.

[73] Assignee: Nartron Corporation, Reed City, Mich.

[21] Appl. No.: 752,834

[22] Filed: Aug. 30, 1991

[51] Int. Cl.$^5$ .............. G01B 7/30; G01B 7/14; F02D 9/00
[52] U.S. Cl. .............. 324/207.12; 123/376; 324/207.2; 324/207.21; 324/207.25
[58] Field of Search .............. 324/173, 174, 207.12, 324/207.14, 207.20, 207.21, 207.25; 137/553, 554; 123/414, 617, 376

[56] References Cited
U.S. PATENT DOCUMENTS

| | | |
|---|---|---|
| 4,392,375 | 7/1983 | Eguchi et al. |
| 4,570,118 | 2/1986 | Tomczak et al. ............ 324/207.2 |
| 4,639,665 | 1/1987 | Gary .............. 324/207.2 X |
| 4,703,261 | 10/1987 | Berchtold ............ 324/207.2 |
| 4,789,826 | 12/1988 | Willett ............ 324/207.2 |
| 4,893,502 | 1/1990 | Kubota et al. |

FOREIGN PATENT DOCUMENTS
473188 6/1975 U.S.S.R. ............ 324/207.2

OTHER PUBLICATIONS
"The magnetoresistive sensor", Philips Technical Publication, 268, Jun., 1988, pp. 1-18.

Primary Examiner—Gerard R. Strecker
Attorney, Agent, or Firm—Brooks & Kushman

[57] ABSTRACT

A non-contacting type sensor and method for sensing angular position are provided for sensing the angular position of a body such as a throttle valve. The sensor includes a stator assembly and a rotor assembly adapted to be coupled to the body for rotation relative to the stator assembly. The rotor assembly includes a closed-loop magnetic flux concentrator which defines a controlled electromagnetic cavity and generating means for generating a first magnetic field within the cavity. The stator assembly includes a semiconductor device disposed within the cavity and having an electrical property which is a function of the orientation and strength of a resultant magnetic field. The stator assembly further includes a coil wound about the device for producing a second magnetic field which substantially cancels the effects of the first magnetic field on the device so as to obtain the resultant magnetic field. The electrical current in the coil required to produce the second magnetic field provides an indication of the angular position of the body.

17 Claims, 4 Drawing Sheets

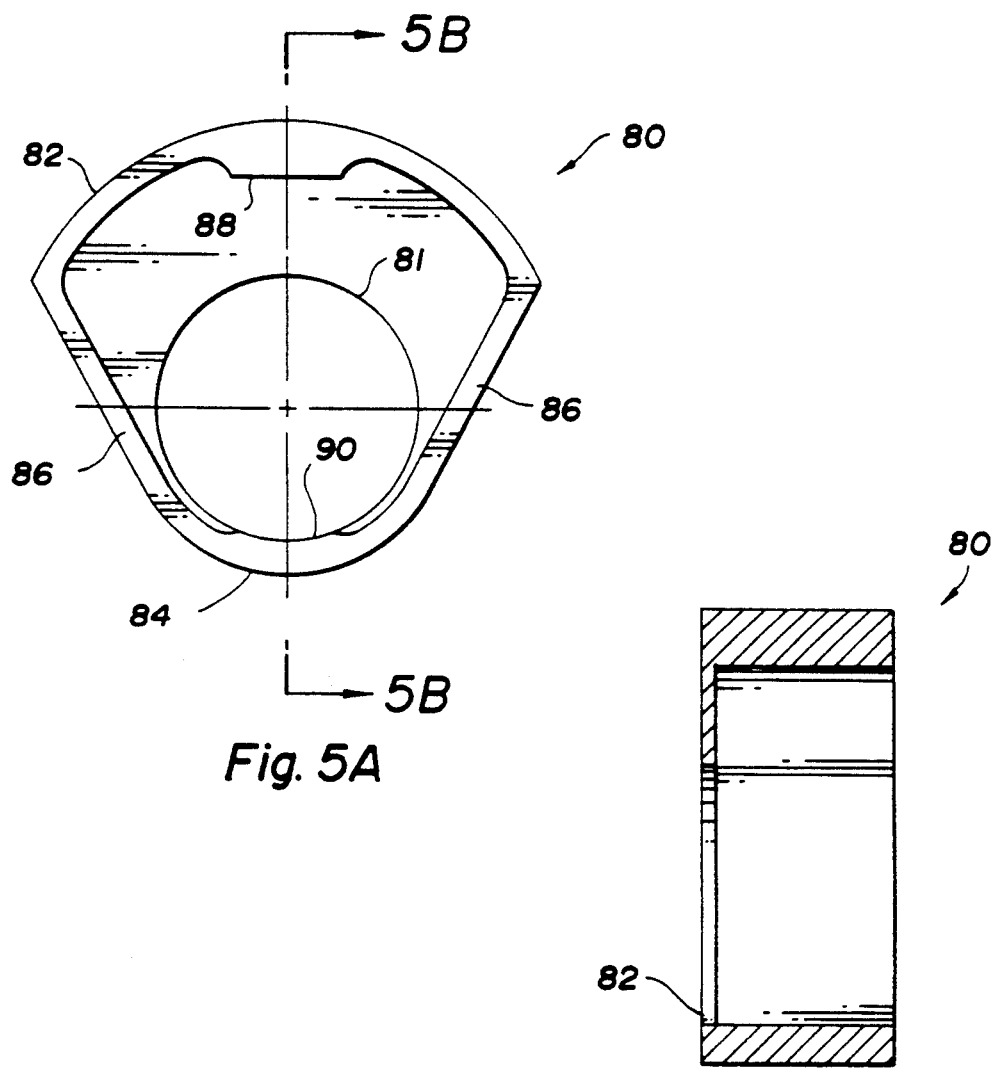
Fig. 5A
Fig. 5B
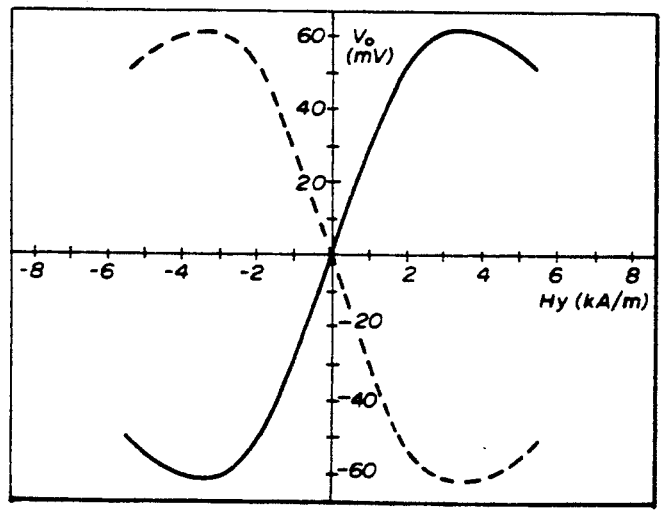
Fig. 6

5,270,645

LINEAR-OUTPUT, TEMPERATURE-STABLE ROTATIONAL SENSOR INCLUDING MAGNETIC FIELD RESPONSIVE DEVICE DISPOSED WITHIN A CAVITY OF A FLUX CONCENTRATOR

TECHNICAL FIELD

The present invention is related to a sensor and method for sensing angular position and, more particularly, to a non-contact throttle position sensor and method for sensing the angular position of a rotating body, such as a throttle valve.

BACKGROUND ART

With the advent of on-board automotive electronic engine controls, the need to precisely monitor throttle valve position arose. Early throttle position sensors, in their simplest forms, were potentiometers mechanically linked to the throttle valve (i.e. butterfly) shaft. While this solution provided reasonable accuracy and generally adequate performance at a reasonable cost, the nature of the application resulted in unacceptable failure rates.

These failures were caused primarily from the wearing out of the potentiometer hardware. The large number of cycles resulting from normal automobile use, coupled with the "dither" caused by engine vibration, resulted in the contact and/or the resistive element being eroded by friction.

In an attempt to avoid the above-noted problems, non-contact electronic sensors were developed. These attempts, however, were largely unsuccessful, as the high temperature environment of an engine mounted sensor exceeded operational limits of commercial and military componentry. A further complication plaguing most electronic sensors is their inherent temperature instability, which requires extensive and elaborate compensation techniques.

Philips Technical Publication No. 268, entitled "The Magnetoresistive Sensor—a sensitive device for detecting magnetic-field variations", published in the Netherlands and released on Jun. 20, 1988, discloses drive circuitry and an associated coil and sensor arrangement for measuring a magnetic field by a null-field method. An external field is applied to the sensor which causes a current to pass through the coil, thereby setting up a magnetic feedback system in which the coil-generated field almost compensates the external field. A small residual field exists, however, sufficient to maintain the current through the coil and the compensating field generated by it. The sensor output voltage is thus a direct measure of the coil-generated field and hence of the external field to be measured.

U.S. Pat. No. 4,392,375, Eguchi et al., discloses a non-contacting type rotational angle detecting apparatus for sensing the rotational angle of a throttle valve or the like including a magnetic sensing element. The apparatus further includes a non-rotating member fixedly positioned opposite to a rotating member, a magnetic field generating source such as a permanent magnet on one end of the rotating member and the non-rotating member to generate a magnetic field. The magnetic sensing elements generates an output signal which varies in dependence on the direction of the magnetic field. By presetting the intensity of the permanent magnet to a sufficiently large value so as to saturate the output component with respect to the intensity of the magnetic field, variations of the sensor output due to the effect of temperatures can be prevented.

U.S. Pat. No. 4,893,502, Kubota et al., discloses a non-contact type angle sensor for a throttle valve of an internal combustion engine. In one embodiment, the sensor includes a magnetic field generating element disposed on one end of a rotatable throttle shaft, a magneto-sensitive element disposed opposite to the field generating element at a position fixed relative to a throttle body and spaced apart from the field generating element. The magneto-sensitive elements generates an output whose level changes with the rotation of the throttle valve shaft relative to the throttle body and an electrical circuit for converting the output of the element into an electrical signal. In this embodiment, the electrical circuit includes temperature compensation circuitry having an amplifier and a thermistor.

Even those prior art sensors capable of satisfying the temperature and accuracy requirements are often too costly for commercial viability.

SUMMARY OF INVENTION

It is therefore a general object of the present invention to provide an improved non-contacting type throttle position sensor whose operation is unaffected by temperature variations.

In carrying out the above object and other objects of the present invention, a sensor is provided for sensing the angular position of a body, such as a throttle valve. The sensor includes a stator assembly and a rotor assembly adapted to be coupled to the body for rotation relative to the stator assembly. One of the assemblies includes means for defining a controlled electromagnetic cavity and generating means for generating a first magnetic field within the cavity. The other assembly includes a semiconductor device disposed within the cavity and having an electrical property which is a function of the orientation and strength of a resultant magnetic field. The other assembly further includes a coil wound about the device for producing a second magnetic field which substantially cancels the effects of the first magnetic field on the device so as to obtain the resultant magnetic field. The electrical current in the coil required to produce the second magnetic field provides an indication of the angular position of the body.

The advantages accruing to the sensor of the present invention are numerous. For example, the means for defining a controlled electromagnetic cavity concentrates the magnetic flux from a single permanent magnet through the semiconductor device and magnetically shields the device from stray magnetic fields and the effects of interactions with magnetic materials proximate to the sensor. Additionally, the coil operates to nullify the effect of temperature on the sensor output.

BRIEF DESCRIPTION OF DRAWINGS

FIG. 5a is a plan view of the means for defining a controlled electromagnetic cavity or flux concentrator of the present invention;

FIG. 5b is a cross-sectional view of the flux concentrator shown in FIG. 5a taken along the line 5B—5B;

FIG. 6 is a graphical representation of the output voltage characteristic of the magnetoresistive sensor for use with the present invention.

BEST MODE FOR CARRYING OUT THE INVENTION

Figure 1:
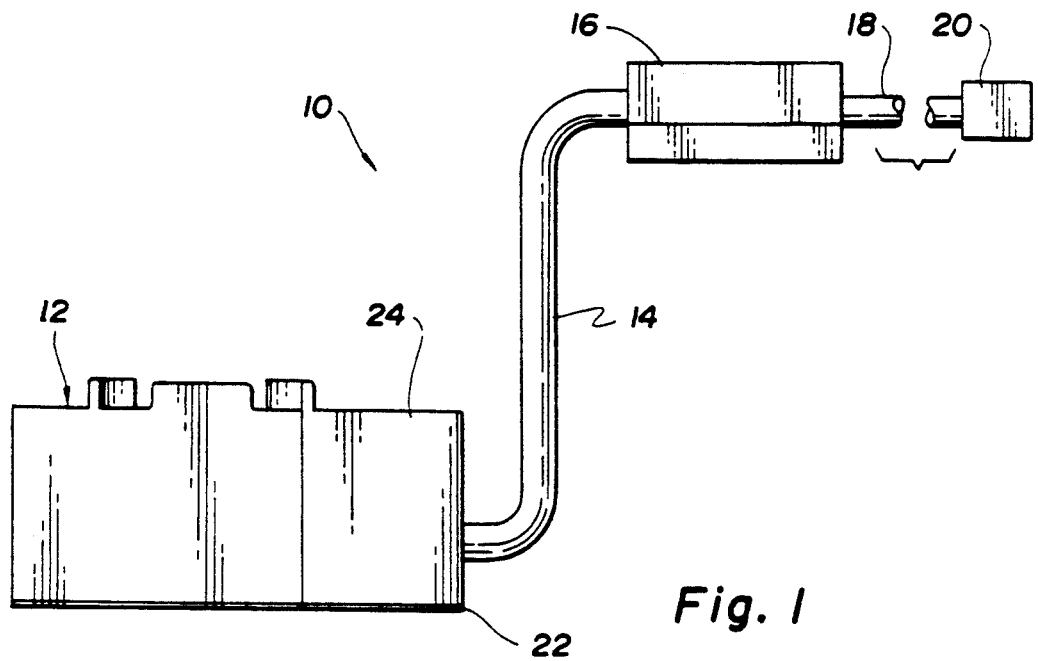
FIG. 1 is a side view of the non-contacting angular position sensor of the present invention.

Referring now to FIG. 1, there is shown a throttle position sensor generally indicated by the reference numeral 10 including a sensor body 12, an electronic module 16 and a connector 20. The sensor 10 also includes electrical wiring 14 and 18, which provide a means for the communication of position information between the sensor body 12, the electronic module 16 and a master processor (not specifically illustrated), such as a microprocessor of a vehicle electronic control unit.

Figure 2:
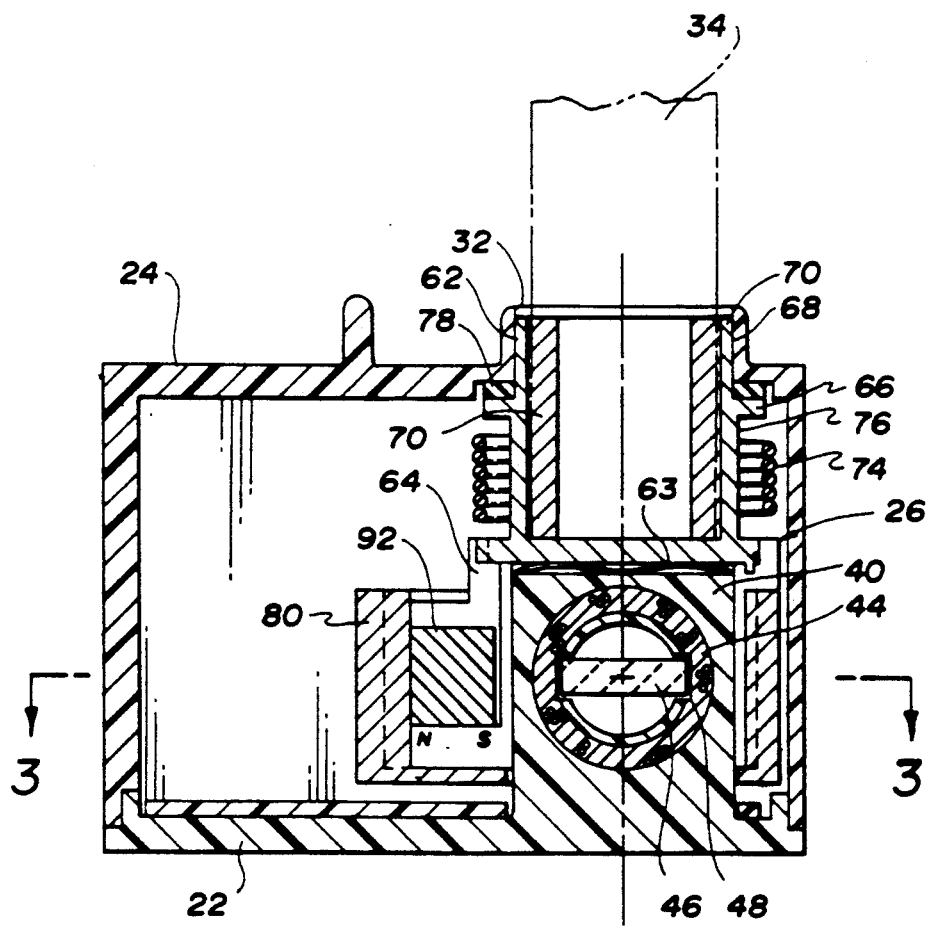
FIG. 2 is a partial cross-sectional view of the sensor shown in FIG. 3 taken along the line 2—2.
Figure 3:
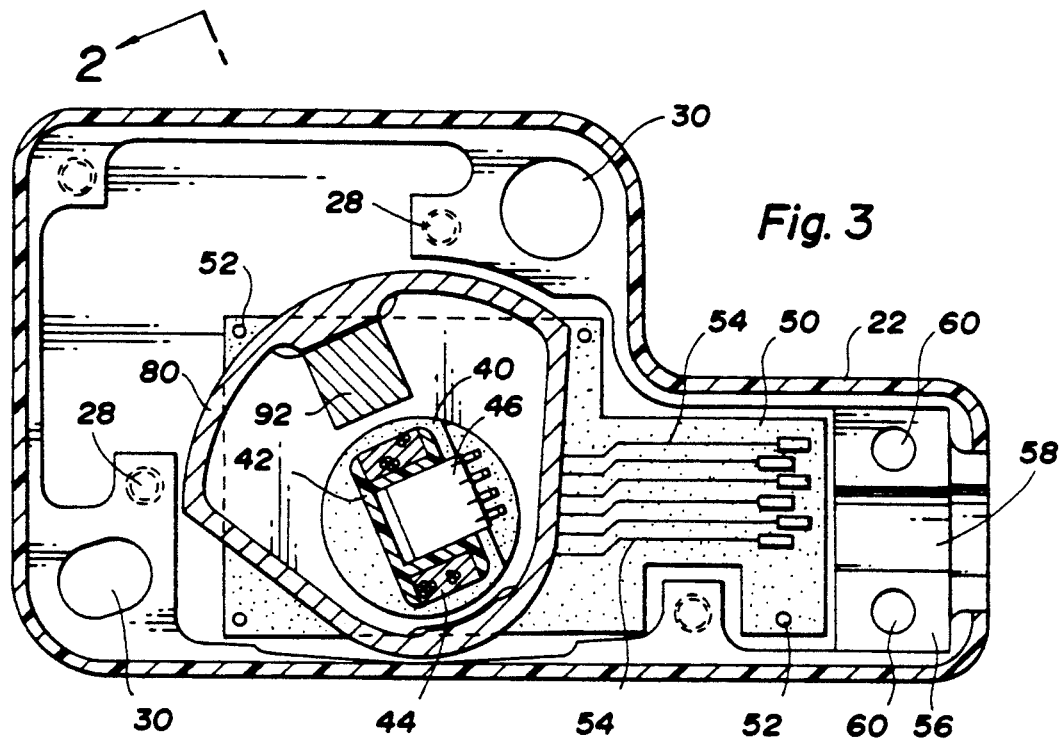
FIG. 3 is a cross-sectional view of the sensor shown in FIG. 2 taken along the line 3—3.

With additional reference to FIG. 2 and FIG. 3, the sensor body 12 is shown to include a base 22 and a cover 24 preferably made of a commercially available plastic material such as Rynite or Ryton and a rotor assembly 26. The cover 24 cooperates with the base 22 to form a substantially hollow housing for the rotor assembly 26. It should be appreciated that electronics could be housed in the housing.

The base 22 is affixed to the cover 24 utilizing screws, bolts or the like (not specifically shown) that cooperate with the plurality of threaded bores 28 in the cover 24. Passages 30 provide a means for affixing the throttle position sensor 10 to a carburetor, throttle body or the like such that a throttle shaft 34 extends through the aperture 32 in cover 24 and mates with the rotor assembly 26.

In the preferred embodiment, a pedestal 40 is molded as part of the base 22 and is adapted to receive a coil bobbin 42. A coil 44 is wound around the bobbin 42 which is preferably affixed to the pedestal 40 by an adhesive. The bobbin 42 includes a slot 48 for slidably receiving a semiconductor device or magnetoresistive sensor 46. The magnetoresistive sensor 46 is preferably affixed to the bobbin 42 by adhesive.

Electrical connections from the coil 44 and magnetoresistive sensor 46 are made to a printed circuit board 50. The printed circuit board 50 is affixed to the base 22 utilizing a plurality of stakes 52 preferably molded as part of the base 22. The printed circuit board 50 has a plurality of electrical traces 54 formed thereon which are electrically connected to the electrical wiring 14.

A wiring clamp 56 is also preferably molded as part of the base 22. The clamp 56 has a plurality of threaded bores 60 and a generally U-shaped groove 58 for receiving the electrical wiring 14. The clamp 56 cooperates with a fastener (not specifically shown) to secure the wiring 14 to the base 22, thereby providing strain relief.

With continuing reference to FIG. 2 and FIG. 3, the rotor assembly 26 is also preferably molded of a commercially available plastic material such as Rynite or Ryton and includes a rotor cylinder 62 and rotor base 64. The rotor cylinder 62 is fixedly attached to the rotor base 64. A generally circular shoulder 66 defines a first neck portion 68 and a second neck portion 76 on the cylinder 62.

A silicone seal ring 78 is preferably concentrically positioned around the first neck portion 68 of the cylinder 62 and rests on the shoulder 66. When the rotary position sensor 10 is assembled, the first neck portion 68 extends through the aperture 32. Thus, the seal ring 78 is in contact with the shoulder 66 and the cover 24, preventing the entry of moisture, contaminants or the like into the sensor body 12.

Figure 2A:
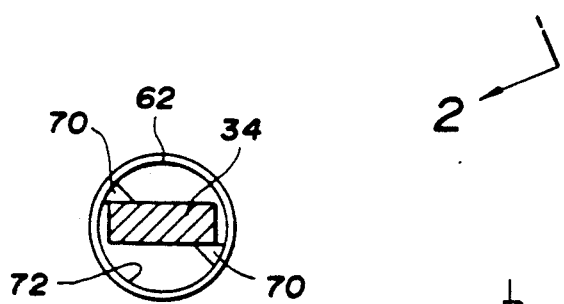
FIG. 2a is a partial cross-sectional plan view of the rotor cylinder illustrating the throttle shaft cooperating with the drive tangs.

As best shown in FIG. 2a, a plurality of generally triangular drive tangs 70 are molded on an inner surface 72 of the rotor cylinder 62. In the preferred embodiment, the drive tangs 70 are positioned around the cylinder 62 such that the throttle shaft 34 mates with the rotor cylinder 62.

Figure 4:
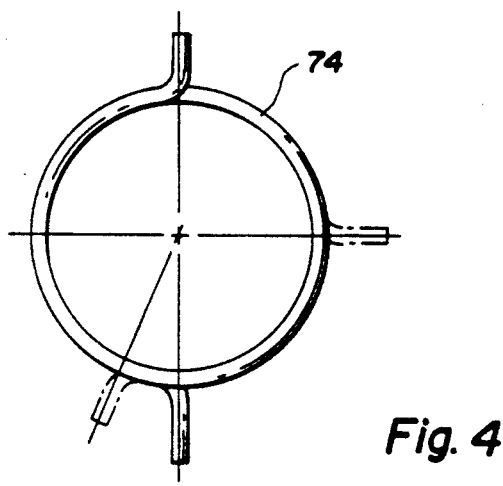
FIG. 4 is a plan view of the torsion spring for use with the present invention.

With additional reference to FIG. 4, a torsion spring 74 is concentrically positioned around the second neck portion 76 of the rotor cylinder 62. The torsion spring 74 operates to maintain constant rotational pressure on the drive tangs 70 of the rotor cylinder 62 against the throttle shaft 34, thereby eliminating mechanical "slop" or hysteresis.

In the preferred embodiment, the rotor base 64 has a generally cylindrical cavity eccentrically disposed therein and extending therethrough. The axis of the cavity is substantially aligned with the axis of the rotor cylinder 62 and the cavity is sized so as to slidably receive the pedestal 40 for rotation thereabout, as described in greater detail herein below. A wave washer 63 is preferably positioned within the cylindrical cavity to provide proper spacing between the base of the rotor cylinder 62 and the top of the pedestal 40.

Referring again to FIG. 2 and FIG. 3, the rotor base 64 further includes a means for defining a controlled electromagnetic cavity, or magnetic flux concentrator 80. The concentrator 80 receives the rotor base 64 and is preferably constructed of a magnetically-permeable material, such as CMI-C ultra-low carbon iron manufactured by Connecticut Metals, Inc., of Waterbury, Conn. A plurality of stakes (not specifically illustrated) are utilized to secure the flux concentrator 80 to the rotor base 64.

As best shown in FIG. 5a and FIG. 5b, the flux concentrator 80 is preferably cardioid-shaped and generally hollow. The cardioid shape results in a smaller overall sensor package while providing the required range of rotation. The concentrator 80 includes a bottom wall having a circular aperture 81 disposed therein and generally aligned with the cylindrical cavity of the rotor base 64.

The flux concentrator 80 is constructed of a plurality of side walls including a first generally circular member 82 having a first radius of curvature and a second generally circular member 84 having a second radius of curvature. The first circular member 82 is connected to the second circular member 84 by a pair of legs 86.

In the preferred embodiment, the first circular member 82 further includes a flange or protrusion 88 formed thereon generally at the center. Similarly, the second circular member includes a flange or protrusion 90 formed thereon. The protrusions 88 and 90 extend inward toward each other.

Referring again to FIG. 2 and FIG. 3, a magnetic field generating means such as a permanent magnet 92 is preferably molded within the rotor base 64. The magnet 92 is positioned within the rotor base 64 in close proximity to the protrusion 88 and generally parallel to the horizontal axis of the sensor 46. In the preferred embodiment, the magnet 92 is positioned within the rotor base 64 such that the South pole "S" of the magnet 92 is proximate to the sensor 46.

The protrusions 88 and 90 of the flux concentrator 80 are designed so as to provide a generally closed path for the magnetic flux of the magnet 92. Thus, the concentrator 80 functions to concentrate the flux from the magnet 92 through the magnetoresistive sensor 46.

It should be noted that the construction of the flux concentrator 80 as described above defines a controlled electromagnetic cavity. In addition to concentrating the flux through the magnetoresistive sensor 46, the concentrator 80 functions to magnetically shield the sensor 46 from the influence of stray magnetic fields. The concentrator 80 also shields the magnet 92 so that the flux from the magnet 92 does not interact with other magnetically permeable materials, which would distort the flux path.

As the throttle shaft 34 rotates, the rotor assembly 26 and, therefore, the magnet 92, rotates around the magnetoresistive sensor 46 through about 100°. The sensor 46 produces an output corresponding to the angular displacement of the throttle shaft 34, as described in greater detail herein below. It should be noted that this preferred construction as described above eliminates moving wires and the known problems associated therewith.

In the preferred embodiment, the magnetoresistive sensor 46 is basically a resistive bridge, such as the Phillips KMZ-10A. It should be appreciated, however, that a different magnetic field sensor such as a Hall-effect type sensor could be employed as the sensor 46.

As is known, the presence of a magnetic field induces stresses in a magnetically-permeable material plated on the sensor silicon of the magnetoresistive sensor 46. These stresses result in a change in resistance, which is a function of the magnetic field strength. When supplied with a current, the sensor 46 outputs a voltage proportional to this field strength.

As best shown in FIG. 6, the sensor 46 is sensitive to the orientation of the magnetic field. As the magnet 92 of the rotor assembly 26 is rotated around the magnetoresistive sensor 46, the sensor 46 produces a generally sinusoidal output voltage ($V_o$). It should be noted that by restricting rotor assembly 26 rotation (i.e. selecting about 100°), a relatively linear output voltage can be attained.

In the absence of a magnetic field, the magnetoresistive sensor 46 is essentially balanced, providing zero differential output voltage. Since the "arms" (i.e. the sense outputs of the bridge) of the magnetoresistive sensor 46 are affected by temperature equally when the sensor 46 is balanced, temperature changes have little affect on the output voltage.

When the bridge becomes unbalanced (due to magnetic flux from the magnet 92), however, the sensitivity of the magnetoresistive sensor 46 is affected by temperature. In the preferred embodiment, a nulling technique, as described below, is utilized to cancel the external magnetic field from the magnet and thereby substantially eliminate the effect of temperature.

Figure 7:
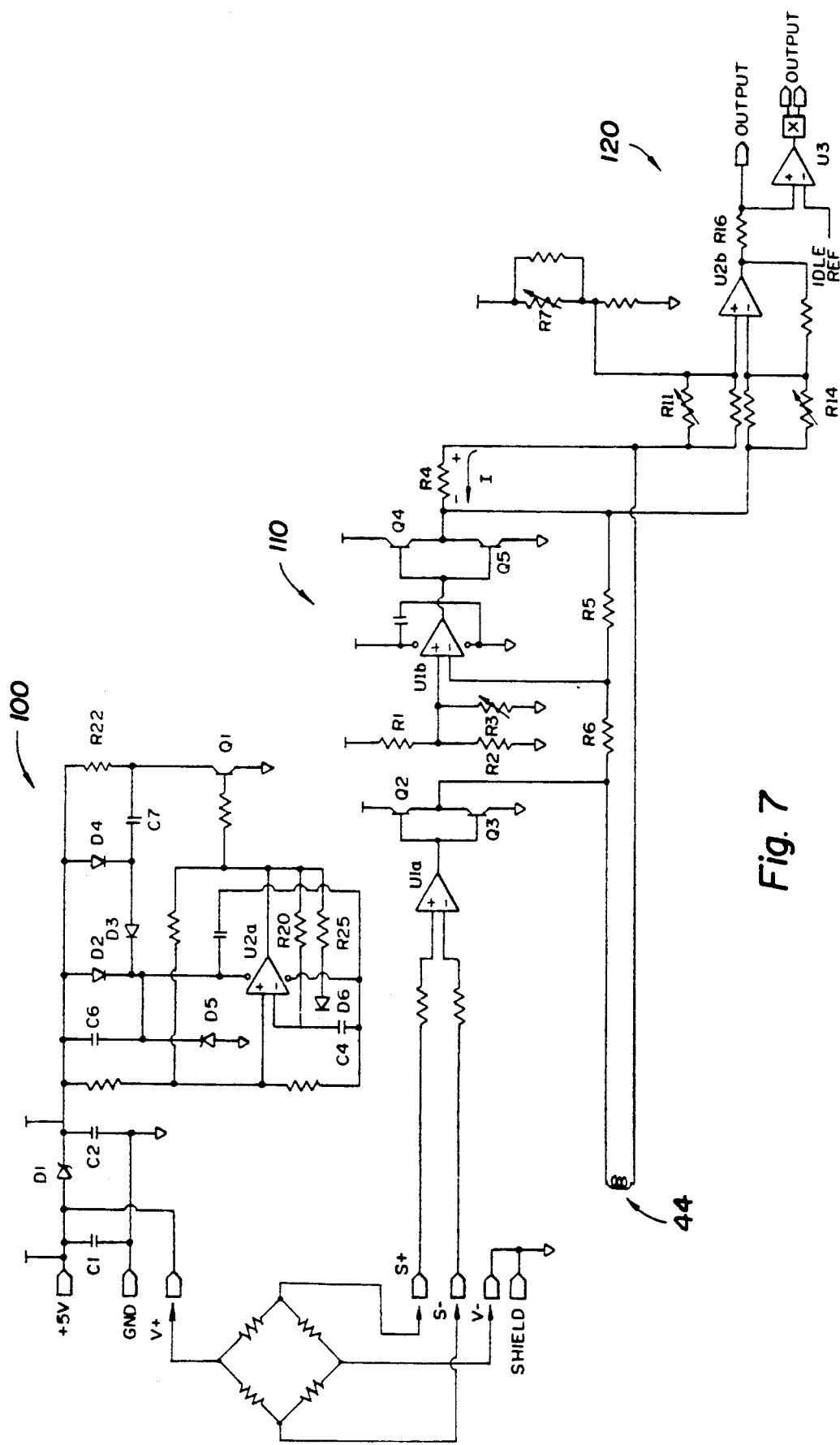
FIG. 7 is a schematic of the electronic circuitry for use with the present invention.

Referring now to FIG. 7, the circuitry is preferably housed within the electronic module 16 and is generally arranged to modulate current in the coil 44, so as to produce an internal magnetic field which substantially cancels the magnetic field of the permanent magnet 92 and its effect on the sensor 46. It should be appreciated that the circuitry could also be housed within sensor body 12.

As shown in FIG. 7, the circuitry includes switching power supply circuitry indicated generally by reference numeral 100, nulling circuitry indicated generally by reference numeral 110 and output circuitry indicated generally by reference numeral 120.

In the preferred embodiment, 5 VDC is supplied to the power supply circuitry 100 from the engine control module. The input stage of the power supply circuitry 100 provides power to the V+ input of the magnetoresistive sensor 46 and acts as a power supply conditioner, while capacitor C1 provides electrostatic discharge (ESD) protection. Schottky rectifier diode D1 protects against reverse polarity damage and capacitor C2 serves as a noise filter.

The throttle position sensor 10 output signal preferably varies from 0 VDC to 5 VDC over the range of throttle shaft 34 rotation. In order to achieve a 5 VDC output signal, a voltage greater than 5 VDC must be supplied to the output operational amplifier (op-amp) U2b of the output circuitry 120. This voltage is actually developed in the power supply circuitry 100, as described in greater detail herein below.

Op-amp U2a of the power supply circuitry 100 is preferably configured as a classic oscillator, with VDD supplied thereto through diode D2. U2a is coupled to the base of transistor Q1. When the output of U2a is "high", transistor Q1 turns on and capacitor C7 charges through diode D4. The charging of C7 occurs rapidly, so the pulse width of U2a and, therefore, the "on-time" of Q1 need not be long. Diode D6 and resistor R25 in the feedback loop shorten the on-time relative to the off-time, which is determined by resistor R20 and timing capacitor C4, so as to conserve power. When transistor Q1 turns off, resistor R22 pulls the (—) end of capacitor C7 to the +5 VDC rail. The (+) end of C7 then goes above the +5 VDC rail and capacitor C6 is charged through diode D3. Capacitor C6 similarly goes above the +5 VDC rail, resulting in diode D2 disconnecting. This voltage "booster" thus powers U2a. It should be appreciated that zener diode D5 ensures that the boosted voltage does not rise to a level that would damage U2a.

The operating voltage of U2a then rises to around +8 VDC. Output conditioning amplifier U2b of the output circuitry 120 is, of course, powered by the same bootstrapped voltage source since it is on the same integrated circuit chip. The output of U2b and, therefore, the output of the throttle position sensor 10, can then easily supply the requisite +5 VDC signal level.

Magnetoresistive sensor 46 outputs S+ and S— provide input signals to the nulling circuitry 110 based on the magnetic field from the magnet 92. Magnetoresistive sensor 46 input V—, the opposite side of the bridge, is grounded so that the "arms" of the sensor 46 are then at about 2.5 VDC in the quiescent state, referenced to GND. This sensor (a differential) output is supplied to U1a, whose output then sits at about 2.5 VDC, referenced to GND, in the absence of any bridge unbalance. The output of U1a is preferably connected to the "totem-pole" amplifying transistors Q2 and Q3. It should be appreciated that Q2 and Q3 are configured as emitter-followers, so as to provide additional current capacity to drive one side of the compensating coil 44.

In the preferred embodiment, the emitter voltage of the Q2/Q3 connection is supplied to the inverting input of U1b through resistor R6. The output of U1b drives totem-pole amplifying transistors Q4 and Q5. Q4 and Q5, also configured as emitter followers, drive the other side of coil 44 through sense resistor R4. It should be noted that the values of resistors R5 and R6 should be selected so as to form a 2:1 voltage divider and set the gain of U1b to a value of "2". Thus, the resultant is unity gain. U1b then provides a signal exactly the same as U1a, but of opposite polarity.

It should be appreciated that this power bridge arrangement allows the coil 44 to see a nearly rail-to-rail voltage in either polarity. The current in the coil 44 thus creates an "internal" magnetic field which interacts with the external magnetic field from the magnet 92 to create a resultant magnetic field. Preferably, the internal field substantially cancels the effects of the external magnetic field on the sensor 46.

The values of resistors R1 and R2 are preferably selected so as to set the operating point of U1b to match that of U1a, establishing a zero current condition in the coil 44. Resistor R3 is preferably a variable resistor whose value is selected such that the parallel connection of R2 with R3 allows R2 to be "trimmed" to the value required to match U1b to U1a.

With continuing reference to FIG. 7, the conditioning amplifier U2b of the output circuitry 120 is driven by the voltage developed across the sense resistor R4 by the current through the coil 44. The gain of U2b at maximum rotation angle is preferably set by trimming the variable resistor R14, such that full-scale calibration is achieved. To maintain thermal stability, variable resistor R11 is preferably trimmed to have a value substantially equal to that of resistor R14. U2b operates to provide a relatively linear output ranging from a low voltage at idle to about 5 VDC at maximum throttle shaft 34 rotation. Thus, by measuring the current in the coil 44 required to cancel the effects on the sensor 46 of the field established by magnet 92, the strength of the that field is inferred. Cancellation is sensed when the bridge is re-balanced and the sensor 10 is virtually unaffected by temperature.

Resistor R7 is trimmed to have a value such that the throttle position sensor output offset is about 0 VDC at the minimum rotation angle. It should be appreciated that resistor R16 protects the output of U2b from damage should the output become shorted to ground or power.

It should also be appreciated that the idle position of a throttle pedal could be determined with the addition of U3 to the output circuitry 120. Preferably, U3 is configured as a comparator, with the output of U2b driving the noninverting input of U3 and an "idle reference" signal supplied to the inverting input of U3. An isolated switch S1, such as an optocoupler, is connected to the output of U3 and provides an output signal to the vehicle electronic control unit through wiring 18.

It should be appreciated that the invention as herein disclosed represents a means of measuring angular displacement with high accuracy over a range of 0° to 90° of rotation. The sensor 10 has a temperature capability of from −40° Celsius to +150° Celsius made possible by selecting semiconductors capable of operation in this extended temperature range and a mode of sensor operation which is largely independent of temperature.

It should also be appreciated that the invention as disclosed could be utilized anywhere angular measurements (within the limits stated above) are desired. For example, a relatively low-cost, automobile suspension height sensor would be one example where linear motion was converted to rotary motion with an arm and linkage to the suspension, and height controlled automatically (with air shocks) regardless of vehicle loading.

It is understood, of course, that while the forms of the invention herein shown and described constitute the preferred embodiments of the invention, it is not intended to illustrate all possible forms thereof. It will also be understood that the words used are words of description rather than limitation, and that various changes may be made without departing from the spirit and scope of the invention as disclosed.

What is claimed is:

1. A sensor for sensing the angular position of a body, the sensor comprising: a stator assembly and a rotor assembly for rotating about an axis relative to the stator assembly, the rotor assembly being adapted to be coupled to the body to rotate therewith, one of the assemblies including a base supporting a flux concentrator and a magnet proximate the flux concentrator, said flux concentrator defining an electromagnetic cavity which surrounds said magnet for generating a first magnetic field within the cavity, the other assembly including a semiconductor device disposed with the cavity, the flux concentrator being shaped to concentrate and control the magnetic flux of the magnet through the device, the device having an electrical property which is a function of the orientation and strength of a resultant magnetic field and having a coil wound about the device for producing a second magnetic field having a direction which is generally perpendicular to the axis and which substantially cancels the effects of the first magnetic field on the device so as to obtain the resultant magnetic field, whereby when the coil is energized with an electrical current, the electrical current in the coil required to produce the second magnetic field provides an indication of the angular position of the body.

2. A sensor for sensing the angular position of a throttle valve, the sensor comprising: a stator assembly and a rotor assembly for rotating about an axis relative to the stator assembly, the rotor assembly being adapted to be coupled to the throttle valve to rotate therewith, one of the assemblies including a base supporting a flux concentrator and a magnet proximate the flux concentrator, said flux concentrator defining an electromagnetic cavity which surrounds said magnet for generating a first magnetic field within the cavity, the other assembly including a semiconductor device disposed within the cavity, the flux concentrator being shaped to concentrate and control the magnetic flux of the magnet through the device, the device having an electrical property which is a function of the orientation and strength of a resultant magnetic field and having a coil wound about the device for producing a second magnetic field having a direction which is generally perpendicular to the axis and which substantially cancels the effects of the first magnetic field on the device so as to obtain the resultant magnetic field, whereby when the coil is energized with an electrical current, the electrical current in the coil required to produce the second magnetic field provides an indication of the angular position of the throttle valve.

3. The sensor as claimed in claim 1 or 2 further comprising a layer of insulating material having electrical conductors formed thereon and wherein the coil and the device are electrically connected to the conductors.

4. The sensor as claimed in claim 1 or 2 wherein the rotor assembly includes the magnet.

5. The sensor as claimed in claim 1 or 2 wherein the semiconductor device is a magnetic field sensor.

6. The sensor as claimed in claim 5 wherein the magnetic field sensor is a magnetoresistive device.

7. The sensor as claimed in claim 5 wherein the magnetic field sensor is a Hall-effect device.

8. The sensor as claimed in claim 1 or 2 wherein the magnet is a permanent magnet.

9. The sensor as claimed in claim 8 wherein the magnet is positioned about the coil and the semiconductor device for rotation thereabout.

10. A sensor for sensing the angular position of a throttle valve, the sensor comprising: a stator assembly and a rotor assembly for rotating about an axis relative to the stator assembly, the rotor assembly being adapted to be coupled to the throttle valve to rotate therewith, the rotor assembly including a base supporting a flux concentrator and a magnet proximate the flux concentrator, said flux concentrator defining an electromagnetic cavity which surrounds said magnet for generating a first magnetic field within the cavity, the stator assembly including a magnetoresistive device disposed within the cavity, the flux concentrator being shaped to concentrate and control the magnetic flux of the magnet through the device, the device having an electrical property which is a function of the orientation and strength of a resultant magnetic field and having a coil wound about the device for producing a second magnetic field having a direction which is generally perpendicular to the axis and which substantially cancels the effects of the first magnetic field on the device so as to obtain the resultant magnetic field, whereby when the coil is energized with an electrical current, the electrical current in the coil required to produce the second magnetic field provides an indication of the angular position of the throttle valve.

11. A sensor for sensing the angular position of a throttle valve, the sensor comprising: a stator assembly and a rotor assembly for rotating about an axis relative to the stator assembly, the rotor assembly being adapted to be coupled to the throttle valve to rotate therewith, the rotor assembly including a base supporting a flux concentrator and a magnet proximate the flux concentrator, said flux concentrator defining an electromagnetic cavity which surrounds said magnet for generating a first magnetic field within the cavity, the stator assembly including a Hall-effect device disposed within the cavity, the flux concentrator being shaped to concentrate and control the magnetic flux of the magnet through the device, the device having an electrical property which is a function of the orientation and strength of a resultant magnetic field and having a coil wound about the device for producing a second magnetic field having a direction which is generally perpendicular to the axis and which substantially cancels the effects of the first magnetic field on the device so as to obtain the resultant magnetic field, whereby when the coil is energized with an electrical current, the electrical current in the coil required to produce the second magnetic field provides an indication of the angular position of the throttle valve.

12. The sensor as claimed in claim 1 or 2 wherein the flux concentrator is generally cardioid-shaped.

13. The sensor as claimed in claim 2 wherein the sensor includes a housing which encloses the stator and rotor assemblies, the housing having a top surface and adapted to be mounted on a throttle body associated with the throttle valve at the top surface, and wherein the flux concentrator has side and bottom walls surrounding the device, the flux concentrator and the throttle body being made of a material which magnetically shields the device and the magnet when the sensor is mounted on the throttle body.

14. The sensor as claimed in claim 13 wherein the bottom wall has an opening formed therein and wherein the device has electrical conductors extending through the opening.

15. A method of sensing the angular position of a body, the method comprising:
providing a flux concentrator substantially hollowed out to create an electromagnetic cavity, the flux concentrator coupled to the body for rotation therewith;
providing a semiconductor device within the cavity having an electrical property which is a function of the orientation and strength of a resultant magnetic field in the cavity;
generating a first magnetic field within the cavity;
rotating the body so as to rotate the first magnetic field within the cavity;
directing the first magnetic field through the device;
generating a second magnetic field within the cavity which substantially cancels the first magnetic field to obtain the resultant magnetic field; and
determining the amount of second magnetic field generation required to produce a given level of feedback as an indication of the angular position of the body.

16. A method of sensing the angular position of a body, the method comprising:
providing a flux concentrator coupled to the body for rotation therewith and being substantially hollowed out to create an electromagnetic cavity which surrounds a magnet for generating a first magnetic field;
providing a semiconductor device having a coil wound thereabout within the cavity, the device having an electrical property which is a function of the orientation and strength of a resultant magnetic field in the cavity;
rotating the body so as to rotate the first magnetic field within the cavity;
directing the first magnetic field through the device;
energizing the coil so as to produce a second magnetic field which substantially cancels the first magnetic field, to obtain the resultant magnetic field; and
determining the amount of second magnetic field generation required to produce a given level of feedback as an indication of the angular position of the body.

17. The method as claimed in claim 15 or claim 16 wherein the step of directing includes concentrating the first magnetic field through the device and magnetically shielding the device.

* * * * *